United States Patent
Yamabe et al.

(10) Patent No.: US 11,834,048 B2
(45) Date of Patent: Dec. 5, 2023

(54) VEHICLE CONTROL DEVICE, VEHICLE CONTROL METHOD, AND RECORDING MEDIUM

(71) Applicant: Honda Motor Co., Ltd., Tokyo (JP)

(72) Inventors: Tomoaki Yamabe, Saitama (JP); Nozomu Hirosawa, Saitama (JP); Daichi Kato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 87 days.

(21) Appl. No.: 17/563,001

(22) Filed: Dec. 27, 2021

(65) Prior Publication Data

US 2022/0203991 A1   Jun. 30, 2022

(30) Foreign Application Priority Data

Dec. 28, 2020   (JP) .................................. 2020-219018

(51) Int. Cl.
*B60W 30/18*   (2012.01)
*B60W 10/04*   (2006.01)
(Continued)

(52) U.S. Cl.
CPC ...... *B60W 30/18163* (2013.01); *B60W 10/04* (2013.01); *B60W 10/20* (2013.01);
(Continued)

(58) Field of Classification Search
CPC ....... B60W 30/18163; B60W 60/0051; B60W 10/04; B60W 10/20; B60W 50/14;
(Continued)

(56) References Cited

U.S. PATENT DOCUMENTS 11,407,410 B2 *   8/2022   Rosenbaum ......... G05D 1/0088
2019/0143982 A1 *   5/2019   Hashimoto .......... G05D 1/0061
701/23
(Continued)

FOREIGN PATENT DOCUMENTS

| CA | 2993495 C  * | 9/2020  | ............. B60K 31/00 |
| EP | 2119617 A1 * | 11/2009 | ............ B60W 50/16 |
| JP | 2020104634   | 7/2020  | |

OTHER PUBLICATIONS

Lixing et al., "Analysis of Driver's Steering Behavior for Lane Change Prediction," 2019, Publisher: IEEE.*

(Continued)

*Primary Examiner* — Tuan C To
(74) *Attorney, Agent, or Firm* — JCIPRNET

(57) ABSTRACT

A vehicle control device includes a recognition part, a driving control part, and an output control part. When determining there is a section where a current driving mode cannot be continued in a first lane and the vehicle changes to a second lane, the output control part outputs predetermined information, including first and second information, before reaching the section. When detecting an intention to change lanes after outputting the first information, and a lane change to the second lane is completed before outputting the second information, the driving control part continues a first driving mode executed during traveling in the first lane even after the lane change is completed, and when detecting the intention to change lanes after outputting the first information, and the lane change to the second lane is completed after outputting the second information, the driving control part changes to a driving mode imposing a larger task.

20 Claims, 10 Drawing Sheets

(51) Int. Cl.
  *B60W 10/20* (2006.01)
  *B60W 50/14* (2020.01)
  *B60W 60/00* (2020.01)
  *B62D 15/02* (2006.01)

(52) U.S. Cl.
  CPC ........ *B60W 50/14* (2013.01); *B60W 60/0051* (2020.02); *B62D 15/0255* (2013.01); *B60W 2552/10* (2020.02); *B60W 2710/20* (2013.01); *B60W 2720/106* (2013.01); *B60W 2720/125* (2013.01)

(58) Field of Classification Search
  CPC ......... B60W 2552/10; B60W 2710/20; B60W 2720/106; B60W 2720/125; B62D 15/0255
  USPC ........................................................... 701/26
  See application file for complete search history.

(56) References Cited

U.S. PATENT DOCUMENTS

| | | | |
|---|---|---|---|
| 2019/0308619 A1* | 10/2019 | Rosenbaum | G05D 1/0088 |
| 2020/0010088 A1* | 1/2020 | Kokaki | B60W 30/188 |
| 2020/0079380 A1* | 3/2020 | Yu | B60W 60/001 |
| 2020/0158521 A1* | 5/2020 | Iijima | G01C 21/3661 |
| 2020/0172110 A1* | 6/2020 | Uemori | G06T 7/00 |
| 2020/0369293 A1* | 11/2020 | Jeon | B60W 50/14 |
| 2020/0371518 A1* | 11/2020 | Kang | G05D 1/0221 |
| 2020/0377080 A1* | 12/2020 | Kindo | B60W 60/0053 |
| 2021/0064030 A1* | 3/2021 | Jiang | G08G 1/096877 |
| 2021/0146821 A1* | 5/2021 | Yoon | G06V 20/20 |
| 2021/0263157 A1* | 8/2021 | Zhu | G06N 3/08 |
| 2022/0144278 A1* | 5/2022 | Hiramatsu | B60W 30/18054 |
| 2022/0212670 A1* | 7/2022 | Aoki | B60W 30/16 |

OTHER PUBLICATIONS

Puneet et al., "Learning-based approach for online lane change intention prediction," 2013, Publisher: IEEE.*

"Office Action of Japan Counterpart Application" with English translation thereof, dated Sep. 20, 2022, p. 1-p. 6.

* cited by examiner

| Driving mode | Control state | Task |
|---|---|---|
| Mode A | Automatic driving | Forward monitoring: not required<br>Steering grip: not required |
| Mode B | Driving support | Forward monitoring: required<br>Steering grip: not required |
| Mode C | Driving support | Forward monitoring: required<br>Steering grip: required |
| Mode D | Driving support | Forward monitoring: required<br>At least a certain degree of driving operation is required |
| Mode E | Manual driving | Forward monitoring: required<br>Driving operation is required for both steering and acceleration/deceleration |
| Mode F | Automatic driving (emergency stop) | Forward monitoring: not required<br>Steering grip: not required |

↑ Task: light

↓ Task: heavy

FIG. 3

VEHICLE CONTROL DEVICE, VEHICLE CONTROL METHOD, AND RECORDING MEDIUM

CROSS-REFERENCE TO RELATED APPLICATION

This application claims the priority benefits of Japanese application no. 2020-219018, filed on Dec. 28, 2020. The entirety of the above-mentioned patent application is hereby incorporated by reference herein and made a part of this specification.

BACKGROUND

Technical Field

The disclosure relates to a vehicle control device, a vehicle control method, and a recording medium.

Description of Related Art

In recent years, research on automatic driving that automatically controls the traveling of a vehicle has been advanced. In connection with this, a technique is known for stopping a vehicle at an appropriate stop position when it is impossible for the vehicle to join the main line (see, for example, Patent Document 1).

RELATED ART

Patent Document
[Patent Document 1] Japanese Laid-Open No. 2020-104634

Problems to be Solved

When it is notified in advance that automatic driving will be terminated as the number of lanes decreases, the automatic driving may be terminated even though the driver has changed the lane due to a change of lanes. Therefore, there are cases where appropriate vehicle control cannot be performed according to the situation of the vehicle in a lane change.

SUMMARY

A vehicle control device according to one aspect of the disclosure includes: a recognition part that recognizes a surrounding situation of a vehicle; a driving control part that controls one or both of steering and acceleration/deceleration of the vehicle and causes the vehicle to travel in any one of a plurality of driving modes; and an output control part that, when determining that there is a section where a current driving mode cannot be continued in a first lane in which the vehicle travels based on the surrounding situation recognized by the recognition part, and the vehicle is caused to change lanes from the first lane to a second lane, outputs predetermined information by an output part before the vehicle reaches the section. The predetermined information includes first information to be output before reaching the section, and second information to be output after reaching the section. When detecting an intention of an occupant of the vehicle to change lanes after the first information is output by the output control part, and a lane change to the second lane is completed before output of the second information, the driving control part continues a first driving mode that is being executed during traveling in the first lane even after the lane change is completed, and when detecting the intention of the occupant of the vehicle to change lanes after the first information is output by the output control part, and the lane change to the second lane is completed after output of the second information, the driving control part changes a driving mode of the vehicle to a second driving mode in which a task imposed on the occupant is larger than in the first driving mode.

A vehicle control method according to one aspect of the disclosure causes a computer to: recognize a surrounding situation of a vehicle; control one or both of steering and acceleration/deceleration of the vehicle and cause the vehicle to travel in any one of a plurality of driving modes; when determining that there is a section where a current driving mode cannot be continued in a first lane in which the vehicle travels based on the surrounding situation recognized, and the vehicle is caused to change lanes from the first lane to a second lane, output predetermined information by an output part before the vehicle reaches the section, wherein the predetermined information includes first information to be output before reaching the section, and second information to be output after reaching the section, when detecting an intention of an occupant of the vehicle to change lanes after the first information is output by the output part, and a lane change to the second lane is completed before output of the second information, continue a first driving mode that is being executed during traveling in the first lane even after the lane change is completed; and when detecting the intention of the occupant of the vehicle to change lanes after the first information is output by the output part, and the lane change to the second lane is completed after output of the second information, change a driving mode of the vehicle to a second driving mode in which a task imposed on the occupant is larger than in the first driving mode.

A non-transient computer-readable recording medium recording a program according to one aspect of the disclosure causes a computer to: recognize a surrounding situation of a vehicle; control one or both of steering and acceleration/deceleration of the vehicle and cause the vehicle to travel in any one of a plurality of driving modes; when determining that there is a section where a current driving mode cannot be continued in a first lane in which the vehicle travels based on the surrounding situation recognized, and the vehicle is caused to change lanes from the first lane to a second lane, output predetermined information by an output part before the vehicle reaches the section, wherein the predetermined information includes first information to be output before reaching the section, and second information to be output after reaching the section, when detecting an intention of an occupant of the vehicle to change lanes after the first information is output by the output part, and a lane change to the second lane is completed before output of the second information, continue a first driving mode that is being executed during traveling in the first lane even after the lane change is completed; and when detecting the intention of the occupant of the vehicle to change lanes after the first information is output by the output part, and the lane change to the second lane is completed after output of the second information, change a driving mode of the vehicle to a driving mode in which a task imposed on the occupant is larger than in the first driving mode.

BRIEF DESCRIPTION OF THE DRAWINGS

FIG. 3 is a diagram showing an example of a relationship between driving modes, control states of a vehicle M, and tasks.

DESCRIPTION OF THE EMBODIMENTS

Figure 1:
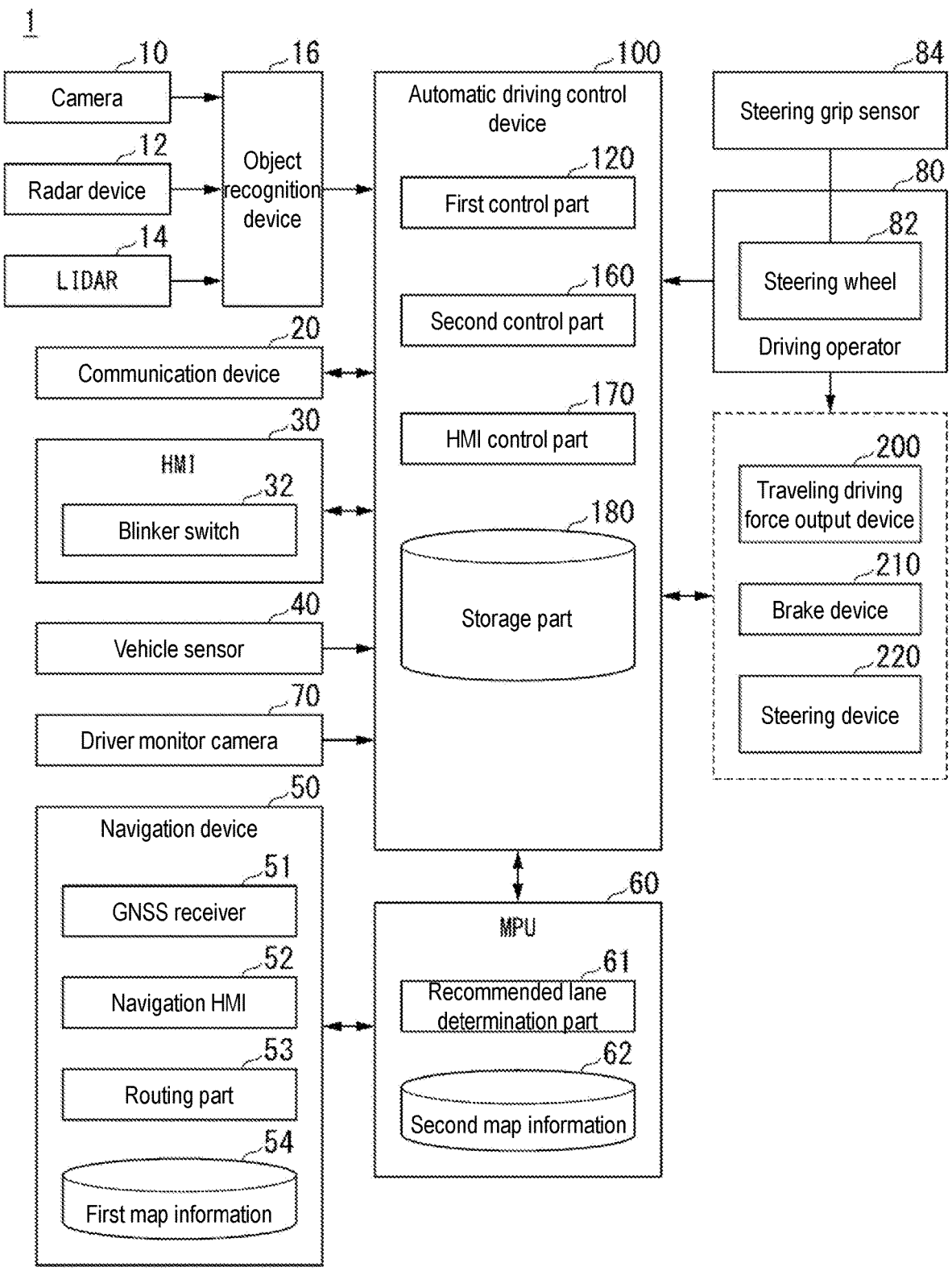
FIG. 1 is a configuration diagram of a vehicle system 1 using a vehicle control device according to an embodiment.

The disclosure provides a vehicle control device, a vehicle control method, and a non-transient computer-readable recording medium recording a program capable of executing more appropriate vehicle control according to the situation of the vehicle in a lane change.

Means for Solving the Problems

The vehicle control device, the vehicle control method, and the recording medium according to the disclosure adopt the following configurations.

(1): A vehicle control device according to one aspect of the disclosure includes: a recognition part that recognizes a surrounding situation of a vehicle; a driving control part that controls one or both of steering and acceleration/deceleration of the vehicle and causes the vehicle to travel in any one of a plurality of driving modes; and an output control part that, when determining that there is a section where a current driving mode cannot be continued in a first lane in which the vehicle travels based on the surrounding situation recognized by the recognition part, and the vehicle is caused to change lanes from the first lane to a second lane, outputs predetermined information by an output part before the vehicle reaches the section. The predetermined information includes first information to be output before reaching the section, and second information to be output after reaching the section. When detecting an intention of an occupant of the vehicle to change lanes after the first information is output by the output control part, and a lane change to the second lane is completed before output of the second information, the driving control part continues a first driving mode that is being executed during traveling in the first lane even after the lane change is completed, and when detecting the intention of the occupant of the vehicle to change lanes after the first information is output by the output control part, and the lane change to the second lane is completed after output of the second information, the driving control part changes a driving mode of the vehicle to a second driving mode in which a task imposed on the occupant is larger than in the first driving mode.

(2): In the aspect of (1) above, when detecting the intention of the occupant of the vehicle to change lanes before the first information is output, the driving control part does not output the first information and the second information to the occupant and continues the first driving mode that is being executed during traveling in the first lane even if a position of completion of the lane change is in the section.

(3): In the aspect of (1) or (2) above, when the lane change of the vehicle to the second lane is not started by the section where the current driving mode of the vehicle cannot be continued while the vehicle is traveling in the first lane, the driving control part stops the vehicle in the first lane.

(4): In the aspect of any one of (1) to (3) above, when the lane change of the vehicle is completed before the second information is output by the output control part, the driving control part suppresses the driving mode of the vehicle from changing to the second driving mode regardless of whether the intention of the occupant of the vehicle to change lanes is detected.

(5): In the aspect of any one of (1) to (4) above, the first information includes information for notifying a takeover of driving to the occupant of the vehicle in advance on the first lane.

(6): In the aspect of any one of (1) to (5) above, the second information includes information for notifying a change from the current driving mode to the second driving mode on the first lane.

(7): In the aspect of any one of (1) to (6) above, the second lane is a lane for the vehicle to reach a destination or a lane for continuing automatic driving.

(8): In the aspect of any one of (1) to (7) above, the lane change includes a lane change executed by the driving control part by detecting the intention of the occupant of the vehicle, and a lane change due to manual driving of the occupant.

(9): In the aspect of any one of (1) to (8) above, the driving control part determines that the lane change from the first lane to the second lane is completed when the vehicle crosses a marking line that divides the first lane and the second lane.

(10): A vehicle control method according to one aspect of the disclosure causes a computer to: recognize a surrounding situation of a vehicle; control one or both of steering and acceleration/deceleration of the vehicle and cause the vehicle to travel in any one of a plurality of driving modes; when determining that there is a section where a current driving mode cannot be continued in a first lane in which the vehicle travels based on the surrounding situation recognized, and the vehicle is caused to change lanes from the first lane to a second lane, output predetermined information by an output part before the vehicle reaches the section, wherein the predetermined information includes first information to be output before reaching the section, and second information to be output after reaching the section, when detecting an intention of an occupant of the vehicle to change lanes after the first information is output by the output part, and a lane change to the second lane is completed before output of the second information, continue a first driving mode that is being executed during traveling in the first lane even after the lane change is completed; and when detecting the intention of the occupant of the vehicle to change lanes after the first information is output by the output part, and the lane change to the second lane is completed after output of the second information, change a driving mode of the vehicle to a second driving mode in which a task imposed on the occupant is larger than in the first driving mode.

(11): A non-transient computer-readable recording medium recording a program according to one aspect of the disclosure causes a computer to: recognize a surrounding situation of a vehicle; control one or both of steering and acceleration/ deceleration of the vehicle and cause the vehicle to travel in any one of a plurality of driving modes; when determining that there is a section where a current driving mode cannot be continued in a first lane in which the vehicle travels based on the surrounding situation recognized, and the vehicle is caused to change lanes from the first lane to a second lane, output predetermined information by an output part before the vehicle reaches the section, wherein the predetermined information includes first information to be output before reaching the section, and second information to be output after reaching the section, when detecting an intention of an occupant of the vehicle to change lanes after the first information is output by the output part, and a lane change to the second lane is completed before output of the second information, continue a first driving mode that is being executed during traveling in the first lane even after the lane change is completed; and when detecting the intention of the occupant of the vehicle to change lanes after the first information is output by the output part, and the lane change to the second lane is completed after output of the second information, change a driving mode of the vehicle to a driving mode in which a task imposed on the occupant is larger than in the first driving mode.

Effects

According to the above aspects (1) to (11), more appropriate vehicle control can be executed according to the situation of the vehicle in a lane change.

Hereinafter, embodiments of a vehicle control device, a vehicle control method, and a recording medium of the disclosure will be described with reference to the drawings.

[Overall Configuration]

FIG. 1 is a configuration diagram of a vehicle system 1 using a vehicle control device according to an embodiment. A vehicle on which the vehicle system 1 is mounted is, for example, a two-wheeled vehicle, a three-wheeled vehicle or a four-wheeled vehicle, and a drive source of the vehicle is an internal combustion engine such as a diesel engine and a gasoline engine, an electric motor or a combination thereof. The electric motor operates by using the electric power generated by a generator connected to the internal combustion engine or the electric power discharged by a secondary battery or a fuel cell. Hereinafter, an embodiment in which the vehicle control device is applied to an automatic driving vehicle will be described as an example. Automatic driving refers to, for example, automatically controlling one or both of steering or acceleration/deceleration of the vehicle to execute driving control. The vehicle driving control described above may include various driving assistances such as ACC (Adaptive Cruise Control) and LKAS (Lane Keeping Assistance System). The driving of the automatic driving vehicle may be controlled by manual driving of an occupant (driver).

The vehicle system 1 includes, for example, a camera 10, a radar device 12, a LIDAR (Light Detection and Ranking) 14, an object recognition device 16, a communication device 20, an HMI (Human Machine Interface) 30, a vehicle sensor 40, a navigation device 50, an MPU (Map Positioning Unit) 60, a driver monitor camera 70, a driving operator 80, an automatic driving control device 100, a traveling driving force output device 200, a brake device 210, and a steering device 220. These devices and apparatuses are connected to each other by a multiplex communication line such as a CAN (Controller Area Network) communication line, a serial communication line, a wireless communication network, etc. The configuration shown in FIG. 1 is merely an example, and a part of the configuration may be omitted or another configuration may be added. The HMI 30 is an example of the "output part". The automatic driving control device 100 is an example of the "vehicle control device".

The camera 10 is, for example, a digital camera using a solid-state imaging element such as a CCD (Charge Coupled Device) or a CMOS (Complementary Metal Oxide Semiconductor). The camera 10 is attached to an arbitrary position on the vehicle (hereinafter referred to as the vehicle M) on which the vehicle system 1 is mounted. When imaging the front, the camera 10 is attached to the upper part of a front windshield or the back surface of a rearview mirror. The camera 10 periodically and repeatedly images the surroundings of the vehicle M, for example. The camera 10 may be a stereo camera.

The radar device 12 radiates radio waves such as millimeter waves to the surroundings of the vehicle M, and detects radio waves (reflected waves) reflected by an object to detect at least the position (distance and orientation) of the object. The radar device 12 is attached to an arbitrary position on the vehicle M. The radar device 12 may detect the position and speed of the object by FM-CW (Frequency Modulated Continuous Wave).

The LIDAR 14 emits light (or an electromagnetic wave having a wavelength close to that of light) to the surroundings of the vehicle M and measures the scattered light. The LIDAR 14 detects the distance to the target based on the time from light emission to light reception. The emitted light is, for example, a pulsed laser beam. The LIDAR 14 is attached to an arbitrary position on the vehicle M.

The object recognition device 16 performs sensor fusion processing on the detection results of some or all of the camera 10, the radar device 12, and the LIDAR 14, and recognizes the position, type, speed, etc. of the object. The object recognition device 16 outputs the recognition result to the automatic driving control device 100. The object recognition device 16 may output the detection results of the camera 10, the radar device 12, and the LIDAR 14 to the automatic driving control device 100 directly. The object recognition device 16 may be omitted from the vehicle system 1.

The communication device 20 uses, for example, a cellular network, a Wi-Fi network, Bluetooth (registered trademark), DSRC (Dedicated Short Range Communication) or the like to communicate with other vehicles existing around the vehicle M or communicate with various server devices via a wireless base station.

The HMI 30 presents various information to the occupant of the vehicle M under the control of an HMI control part 170, and receives an input operation of the occupant. The HMI 30 includes, for example, various display devices, speakers, microphones, buzzers, touch panels, switches, keys, etc. The switches include, for example, a blinker switch (direction indicator) 32. The blinker switch 32 is provided on, for example, a steering column or a steering wheel. The blinker switch 32 is, for example, an example of an operation part that receives an instruction of the occupant to change lanes for the vehicle M. For example, when the blinker switch 32 is operated in the direction in which the vehicle M changes lanes, a lighting part (blinker) outside the vehicle associated with the direction in which the vehicle M changes lanes blinks.

The vehicle sensor 40 includes a vehicle speed sensor that detects the speed of the vehicle M, an acceleration sensor that detects the acceleration, a yaw rate sensor that detects the angular speed around the vertical axis, an orientation sensor that detects the direction of the vehicle M, etc.

The navigation device 50 includes, for example, a GNSS (Global Navigation Satellite System) receiver 51, a navigation HMI 52, and a routing part 53. The navigation device 50 holds first map information 54 in a storage device such as an HDD (Hard Disk Drive) or a flash memory. The GNSS receiver 51 identifies the position of the vehicle M based on the signal received from a GNSS satellite. The position of the vehicle M may be identified or complemented by an INS (Inertial Navigation System) using the output of the vehicle sensor 40. The navigation HMI 52 includes a display device, a speaker, a touch panel, a key, etc. The navigation HMI 52 may be partially or wholly shared with the above-described HMI 30. The routing part 53 decides the route (hereinafter referred to as the route on the map) to the destination input by the occupant using the navigation HMI 52 with reference to the first map information 54 from the position of the vehicle M identified by the GNSS receiver 51 (or an arbitrary position input), for example. The first map information 54 is, for example, information in which the road shape is expressed by a link indicating a road and nodes connected by the link. The first map information 54 may include road curvature, POI (Point of Interest) information, etc. A route on the map is output to the MPU 60. The navigation device 50 may provide route guidance using the navigation HMI 52 based on the route on the map. The navigation device 50 may be realized by, for example, a function of a terminal device such as a smartphone or a tablet terminal owned by the occupant. The navigation device 50 may transmit the current position and the destination to a navigation server via the communication device 20 and acquire a route equivalent to the route on the map from the navigation server.

The MPU 60 includes, for example, a recommended lane determination part 61, and holds second map information 62 in a storage device such as an HDD or a flash memory. The recommended lane determination part 61 divides the route on the map provided by the navigation device 50 into a plurality of blocks (for example, divides the route per 100 [m] with respect to the vehicle traveling direction), and determines a recommended lane for each block with reference to the second map information 62. The recommended lane determination part 61 determines which lane to travel on from the left. For example, the recommended lane determination part 61 determines the recommended lane so that the vehicle M can travel on a reasonable route to proceed to a branch destination when a branch point exists on the route on the map.

The second map information 62 is more accurate map information than the first map information 54. The second map information 62 includes, for example, information on the center of the lane or information on the boundary of the lane. Further, the second map information 62 may include road information, traffic regulation information, address information (address/zip code), facility information, telephone number information, etc. The second map information 62 may be updated at any time by the communication device 20 through communication with another device.

The driver monitor camera 70 is, for example, a digital camera using a solid-state imaging element such as a CCD or a CMOS. The driver monitor camera 70 is, for example, attached to an arbitrary position on the vehicle M in the position and direction that can image the head of the occupant (hereinafter referred to as the driver) seated in the driver's seat of the vehicle M from the front (in the direction of imaging the face). For example, the driver monitor camera 70 is attached to the upper part of a display device provided in the central part of the instrument panel of the vehicle M.

The driving operator 80 includes, for example, a steering wheel 82, an accelerator pedal, a brake pedal, a shift lever, and other operators. The driving operator 80 is equipped with a sensor that detects the operation amount or whether an operation is performed, and the detection result is output to the automatic driving control device 100 or some or all of the traveling driving force output device 200, the brake device 210, and the steering device 220. The steering wheel 82 is an example of the "operator that receives the steering operation of the driver". The operator is not necessarily annular, and may be in the forms of a deformed steering wheel, a joystick, a button, etc. A steering grip sensor 84 is attached to the steering wheel 82. The steering grip sensor 84 is realized by a capacitance sensor or the like, and outputs a signal capable of detecting whether the driver is gripping the steering wheel 82 (meaning that the driver is in contact with the steering wheel 82 with a force) to the automatic driving control device 100.

The automatic driving control device 100 includes, for example, a first control part 120, a second control part 160, an HMI control part 170, and a storage part 180. The first control part 120, the second control part 160, and the HMI control part 170 are each realized by executing a program (software) by a hardware processor such as a CPU (Central Processing Unit). In addition, some or all of these components may be realized by hardware (circuit part, including circuitry) such as an LSI (Large Scale Integration), an ASIC (Application Specific Integrated Circuit), an FPGA (Field-Programmable Gate Array), a GPU (Graphics Processing Unit), etc., or may be realized by the collaboration of software and hardware. The program may be stored in advance in a storage device (a storage device including a non-transient storage medium) such as an HDD or a flash memory of the automatic driving control device 100, or may be stored in a removable storage medium such as a DVD or a CD-ROM and installed in the HDD or flash memory of the automatic driving control device 100 when the storage medium (non-transient storage medium) is mounted on a drive device. A combination of the action plan generation part 140 and the second control part 160 is an example of the "driving control part". The HMI control part 170 is an example of the "output control part".

The storage part 180 may be realized by the above-mentioned various storage devices, or an SSD (Solid State Drive), an EEPROM (Electrically Erasable Programmable Read Only Memory), a ROM (Read Only Memory) or a RAM (Random Access Memory). The storage part 180 stores, for example, information required for executing the driving control according to the present embodiment, various other information, a program, etc.

Figure 2:
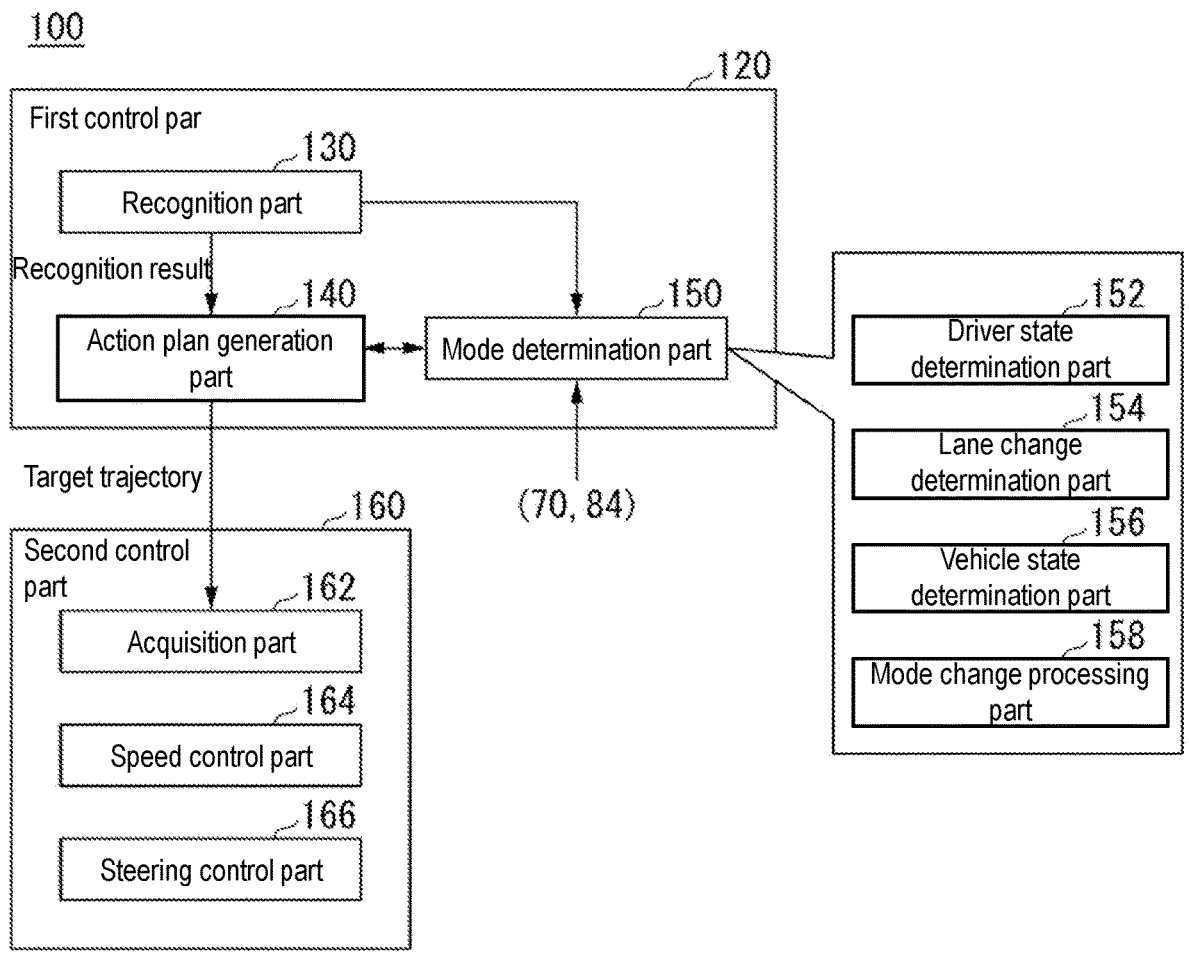
FIG. 2 is a functional configuration diagram of a first control part 120 and a second control part 160.

FIG. 2 is a functional configuration diagram of the first control part 120 and the second control part 160. The first control part 120 includes, for example, a recognition part 130, an action plan generation part 140, and a mode determination part 150. The first control part 120, for example, realizes a function of AI (Artificial Intelligence) and a function of a model given in advance in parallel. For example, the function of "recognizing an intersection" may be executed in parallel with the recognition of an intersection performed by deep learning and the recognition based on a condition given in advance (there is a signal, a road marking, etc. for pattern matching), and be realized by scoring both and making a comprehensive evaluation. Thereby, the reliability of automatic driving is ensured.

The recognition part 130 recognizes the position of an object around the vehicle M and the states such as speed and acceleration based on the information input from the camera 10, the radar device 12, and the LIDAR 14 via the object recognition device 16. The position of the object is recognized as, for example, a position on absolute coordinates with the representative point of the vehicle M (center of gravity, center of drive axis, etc.) as the origin, and is used for control. The position of the object may be represented by a representative point such as the center of gravity or a corner of the object, or may be represented by a region. The "state" of the object may include the acceleration or jerk of the object, or a "action state" (for example, whether the object is changing lanes or is about to change lanes).

Further, the recognition part 130 recognizes, for example, the lane (traveling lane) in which the vehicle M is traveling. For example, the recognition part 130 recognizes the traveling lane by comparing the pattern of road marking lines (for example, an array of solid lines and broken lines) obtained from the second map information 62 with the pattern of road marking lines around the vehicle M recognized from the image captured by the camera 10. The recognition part 130 may recognize the traveling lane by recognizing not only the road marking lines but also the traveling road boundary (road boundary) including the road marking line, the shoulder, the curb, the median strip, the guardrail, etc. In this recognition, the position of the vehicle M acquired from the navigation device 50 and the processing result of the INS may be added. The recognition part 130 also recognizes stop lines, obstacles, red lights, tollhouses, and other road events. In addition, the recognition part 130 recognizes an adjacent lane adjacent to the traveling lane. The adjacent lane is, for example, a lane that can proceed in the same direction as the traveling lane.

When recognizing the traveling lane, the recognition part 130 recognizes the position and posture of the vehicle M with respect to the traveling lane. The recognition part 130 may, for example, recognize the deviation of a reference point of the vehicle M from the center of the lane and the angle formed by the traveling direction of the vehicle M with respect to the line connecting the center of the lane as the relative position and posture of the vehicle M with respect to the traveling lane. Instead of this, the recognition part 130 may recognize the position of the reference point of the vehicle M with respect to any side end portion (road marking line or road boundary) of the traveling lane as the relative position of the vehicle M with respect to the traveling lane. Here, the reference point of the vehicle M may be the center of the vehicle M or the center of gravity. Further, the reference point may be an end portion (front end portion, rear end portion) of the vehicle M, or may be a position where one of a plurality of wheels included in the vehicle M exists.

The action plan generation part 140 generates a target trajectory on which the vehicle M travels in the future automatically (without depending on the driver's operation) so as to in principle travel in the recommended lane determined by the recommended lane determination part 61 and further to respond to the surrounding situation of the vehicle M. The target trajectory includes, for example, a speed element. For example, the target trajectory is expressed as a sequence of points (track points) to be reached by the vehicle M. The track point is a point to be reached by the vehicle M for each predetermined mileage (for example, about several [m]) along the road, and separately, a target speed and a target acceleration for each predetermined sampling time (for example, about 0 commas [sec]) are generated as a part of the target trajectory. Further, the track point may be a position to be reached by the vehicle M at the sampling time for each predetermined sampling time. In this case, the information of the target speed and the target acceleration is expressed by the interval of the track points.

The action plan generation part 140 may set events (functions) of automatic driving when generating the target trajectory. The events of automatic driving include a constant-speed traveling event, a low-speed following traveling event, a lane changing event, a branching event, a merging event, a takeover event, etc. The action plan generation part 140 generates the target trajectory according to the activated event.

The mode determination part 150 determines the driving mode executed by the vehicle M to be one of a plurality of driving modes in which the tasks imposed on the driver are different (in other words, a plurality of modes having different degrees of automation) according to the situation of the vehicle M. The driving control part drives the vehicle M in the mode determined by the mode determination part 150. The mode determination part 150 includes, for example, a driver state determination part 152, a lane change determination part 154, a vehicle state determination part 156, and a mode change processing part 158. These individual functions will be described later.

FIG. 3 is a diagram showing an example of the relationship between the driving modes, the control states of the vehicle M, and the tasks. The driving modes of the vehicle M include, for example, six modes from mode A to mode F. From mode A to mode E, the control state, that is, the degree of automation of the driving control of the vehicle M, is the highest in mode A, then in the order of mode B, mode C, and mode D, and mode E is the lowest. On the contrary, the task imposed on the driver (occupant) is the lightest in mode A, then in the order of mode B, mode C, and mode D, and mode E in which manual driving is performed is the heaviest. In modes B to E, since the control state is not automatic driving, the automatic driving control device 100 is responsible for terminating the control related to automatic driving and shifting to driving support or manual driving. Mode F is, for example, a driving mode for the purpose of minimizing the risk associated with the traveling of the vehicle M, and may be referred to as an MRM (Minimum Risk Maneuver) mode. Hereinafter, the contents of the modes will be illustrated.

In mode A, the vehicle M is in the state of automatic driving, and the driver is not required to perform any of the tasks of monitoring the surroundings of the vehicle M and gripping the steering wheel 82 (hereinafter referred to as "steering gripping"). Whether or not the driver is monitoring the surroundings is determined based on, for example, the analysis result of the image captured by the driver monitor camera 70, and whether or not the driver is gripping the steering is determined based on, for example, the detection result of the steering grip sensor 84. Surrounding monitoring includes at least monitoring the front of the vehicle M (forward monitoring in the figure). The front refers to the space in the traveling direction of the vehicle M which is visually recognized through the front windshield. However, even in mode A, the driver is required to be in a posture that can quickly shift to manual driving in response to a request from the system centered on the automatic driving control device 100. The automatic driving as mentioned here means that both the steering and speed of the vehicle M are controlled without depending on the driver's operation. Mode A is, for example, a driving mode that can be executed when a condition such as the vehicle M is traveling at a predetermined speed (for example, about 50 [km/h]) or less on an expressway such as a highway and a preceding vehicle to be followed exists is satisfied, and may be referred to as a TJP (Traffic Jam Pilot) mode. When this condition is no longer satisfied, the mode determination part 150 changes the driving mode of the vehicle M to mode B.

In addition, the occupant can execute the second task while mode A is being executed. The second task is, for example, an act other than the driving of the occupant permitted during the automatic driving of the vehicle M. The second task includes, for example, watching TV, talking on a mobile phone, sending/receiving e-mail, eating, etc.

In mode B, the vehicle M is in the state of driving support, and the driver is tasked with monitoring the front of the vehicle M (hereinafter referred to as forward monitoring), but is not tasked with gripping the steering wheel 82. For example, in mode B, the lane change of the vehicle M is performed based on the route setting to the destination made by the navigation device 50 at the discretion of the side of the vehicle system 1 without receiving the lane change instruction from the occupant. The lane change refers to moving the vehicle M from the own lane (first lane) in which the vehicle M travels to the adjacent lane (second lane) adjacent to the own lane.

In mode C, the vehicle M is in the state of driving support, and the driver is tasked with forward monitoring and gripping the steering wheel 82. For example, in mode C, when it is determined on the side of the vehicle system 1 that it is required to change the lane of vehicle M, an inquiry is made to the occupant via the HMI 30, and when the occupant's approval of the lane change is received from the HMI 30, the driving support for executing the lane change is performed.

Mode D is a driving mode that requires a certain degree of driving operation performed by the driver with respect to at least one of steering and acceleration/deceleration of the vehicle M. For example, in mode D, the driving support such as ACC (Adaptive Cruise Control) or LKAS (Lane Keeping Assist System) is performed. Further, in mode D, when an instruction for changing the lane of the vehicle M is received by the driver's operation of the blinker switch 32, the driving support for executing the lane change in the instructed direction is performed. The lane change in mode D is an example of the lane change due to the detection of the driver's intention. The lane change in mode D may be executed in mode C. The driver's operation of the blinker switch 32 is an example of the driving operation. Further, the driving operation in mode D may include a driving operation for controlling steering or acceleration/deceleration. The lane change in modes B to D may be an example of the lane changing event.

In mode E, the vehicle M is in a state of manual driving in which the driving operation of the driver is required for both steering and acceleration/deceleration of the vehicle M. In both mode D and mode E, the driver is naturally tasked with monitoring the front of the vehicle M. The driving subject is the driver in modes C to E.

Mode F is, for example, executed when the vehicle M is traveling in the own lane and the lane change of the vehicle M to the adjacent lane is not started by the section in which the current driving mode of the vehicle M cannot be continued, when an abnormality has occurred in at least a part of the external world detection part (camera 10, radar device 12, LIDAR 14) of the vehicle M or when it is determined that the driver is not suitable for driving based on the analysis result of the image captured by the driver monitor camera 70. In mode F, the vehicle M is at least decelerated and urgently stopped at the target position without depending on the driver's operation. In mode F, the steering control of the vehicle M may be executed as required. The target position refers to, for example, a position presumed to be safe for the vehicle M. The target position may be, for example, the shoulder of the road being traveled, a vacant lot near the road, a parking lot, etc. In addition, if there is no vacant lot or parking lot, the vehicle M may be stopped in the lane in which the vehicle M is traveling. The target position may be acquired, for example, by analyzing the image captured by the camera 10, or the target position within a predetermined distance from the vehicle M in the traveling direction of the vehicle M may be acquired by referring to the map information (first map information 54, second map information 62) based on the position information of the vehicle M.

When the vehicle M is in a situation that cannot execute the current driving mode, the mode determination part 150 changes the current driving mode to an appropriate mode according to the situation. Further, the mode determination part 150 may acquire the execution state of the task, and may change the driving mode of the vehicle M to a driving mode having a heavier task when the task related to the determined driving mode is not executed by the driver.

For example, when the driver is in a posture that cannot shift to manual driving in response to a request from the system (for example, when the driver continues to look outside the allowable area or when a sign of difficulty in driving is detected) during the execution of mode A, the mode determination part 150 causes the HMI control part 170 to execute the control for urging the driver to shift to the manual driving of mode E by using the HMI 30. Further, if the driver does not respond even after a predetermined time has passed since the HMI control part 170 executes the control for urging the shift to manual driving, or if it is presumed that the driver is not in the state of performing manual driving, the mode determination part 150 performs control to stop the vehicle M at the target position by automatic driving and stop (terminate) the automatic driving after the stop. Furthermore, after the automatic driving is stopped, the vehicle M is in the state of mode D or E and the vehicle M can be started by manual driving of the driver. Hereinafter, the same applies to "stop automatic driving".

In mode B, if the driver is not monitoring forward, the mode determination part 150 uses the HMI 30 to urge the driver to monitor forward, and if the driver does not respond, the mode determination part 150 performs control to stop the vehicle M at the target position and stop the automatic driving. In mode C, if the driver is not monitoring forward or not gripping the steering wheel 82, the mode determination part 150 uses the HMI 30 to urge the driver to monitor forward and/or grip the steering wheel 82, and if the driver does not respond, the mode determination part 150 performs control to stop the vehicle M at the target position and stop the automatic driving. Further, in mode C and mode D, if the lane change is not executed while the vehicle M reaches the predetermined point, the vehicle M may be stopped at the target position and the automatic driving may be stopped.

The driver state determination part 152 determines whether the occupant (driver) is in a state suitable for driving. For example, the driver state determination part 152 monitors the state of the driver for the above-described mode change, and determines whether the state of the driver corresponds to the task. For example, the driver state determination part 152 analyzes the image captured by the driver monitor camera 70 and performs posture estimation processing, and determines whether the driver is in a posture that cannot shift to manual driving in response to a request from the system. Further, the driver state determination part 152 analyzes the image captured by the driver monitor camera 70 and performs line-of-sight estimation processing, and determines whether the driver is monitoring the surroundings of the vehicle M (more specifically, the front). When it is determined that the driver is not in the state corresponding to the task for a predetermined time or more, the driver state determination part 152 determines that the driver is in a state not suitable for driving of the task. Further, when it is determined that the driver is in the state corresponding to the task, the driver state determination part 152 determines that the driver is in a state suitable for driving of the task. Furthermore, the driver state determination part 152 may determine whether the occupant is in a state that can take over the driving.

The lane change determination part 154 acquires the road shape with reference to the map information (first map information 54, second map information 62) based on the position information of the vehicle M or analyzes the image captured by the camera 10 to determine whether it is required for the vehicle M to change lanes from the own lane (first lane) to the adjacent lane (second lane). For example, if the number of lanes on the road in the traveling direction is reduced, and the own lane is the target lane to be reduced (the lane where the road ends), the lane change determination part 154 determines that it is required to change lanes to the adjacent lane (a lane where the road does not end or a lane where the route can guide to the destination). In addition, for example, if it is under construction ahead in the traveling direction of the own lane or there is an obstacle such as an accident vehicle and the own lane is a climbing lane, the lane change determination part 154 may determine that it is required to change lanes from the own lane to the adjacent lane.

Further, the lane change determination part 154 may determine whether the intention to change lanes of the driver (occupant) of the vehicle M is detected. For example, if the blinker switch 32 is operated, the lane change determination part 154 determines that the intention to change lanes in the instructed direction is detected. Further, the lane change determination part 154 may inquire the driver via the HMI 30 whether to change lanes, and determine that the intention to change lanes is detected when the approval of the lane change is received from the HMI 30.

Further, the lane change determination part 154 may determine whether the vehicle M completes the lane change from the own lane to the adjacent lane. For example, the lane change determination part 154 determines that the lane change is completed when the reference point of the vehicle M exceeds a marking line CL that divides the lanes L1 and L2. Further, for example, the lane change determination part 154 may determine that the lane change is completed when the reference point of the vehicle M is in the center of the adjacent lane, or may determine that the lane change is completed when the entire vehicle M is in the adjacent lane.

The vehicle state determination part 156 determines the traveling state of the vehicle M when the lane change determination part 154 determines that it is required for the vehicle M to change lanes. The traveling state of the vehicle M includes, for example, the current driving mode of the vehicle M, whether the occupant intends to change lanes, the lighting state of the blinker, the timing when the intention to change lanes is detected or the timing when the blinker lights up, the position where the lane change to the adjacent lane is completed, the position and speed of the vehicle M on the road, etc. Further, the vehicle state determination part 156 may acquire information on the content of predetermined information output to the HMI 30 by the HMI control part 170 and information on the output timing.

The mode determination part 150 determines the driving mode of the vehicle M based on the determination results of the driver state determination part 152, the lane change determination part 154, and the vehicle state determination part 156. The mode change processing part 158 performs various processes for changing to the mode determined by the mode determination part 150. For example, the mode change processing part 158 gives an operation instruction to a driving support device (not shown), causes the HMI control part 170 to control the HMI 30 for urging the driver to take action, or instructs to generate a target trajectory for an emergency stop based on the action plan generation part 140.

The second control part 160 controls the traveling driving force output device 200, the brake device 210, and the steering device 220 so that the vehicle M passes the target trajectory generated by the action plan generation part 140 at the scheduled time.

The second control part 160 includes, for example, an acquisition part 162, a speed control part 164, and a steering control part 166. The acquisition part 162 acquires the information of the target trajectory (orbit point) generated by the action plan generation part 140 and stores it in a memory (not shown). The speed control part 164 controls the traveling driving force output device 200 or the brake device 210 based on the speed element associated with the target trajectory stored in the memory. The steering control part 166 controls the steering device 220 according to the degree of bending of the target trajectory stored in the memory. The processing of the speed control part 164 and the steering control part 166 is realized by, for example, a combination of feedforward control and feedback control. As an example, the steering control part 166 executes a combination of feedforward control according to the curvature of the road in front of the vehicle M and feedback control based on the deviation from the target trajectory.

The HMI control part 170 notifies the occupant of the vehicle M of predetermined information by the HMI 30. The predetermined information includes, for example, information related to the traveling of the vehicle M, such as information on the state of the vehicle M and information on driving control. The information on the state of the vehicle M includes, for example, the speed, the engine speed, the shift position of the vehicle M, etc. In addition, the information on driving control includes, for example, information (first information) for notifying the takeover of driving to the occupant in advance while traveling on the own lane when it is required to change lanes from the own lane to the adjacent lane, and information (second information) for notifying that the mode is lowered from the current driving mode to a mode in which the task imposed on the occupant is large on the own lane. Further, the information on driving control may include, for example, information on the inquiry about whether to change lanes, whether driving control is executed, and change in driving control, information on the situation of driving control (for example, the content of the event being executed), etc. Furthermore, the predetermined information may include information not related to the traveling control of the vehicle M, such as the contents (for example, a movie) stored in a storage medium such as a TV program or a DVD. Further, the predetermined information may include, for example, information on the current position and destination of the vehicle M and the remaining amount of fuel.

For example, the HMI control part 170 may generate an image including the above-mentioned predetermined information and display the generated image on the display device of the HMI 30, or may generate a sound indicating the predetermined information and output the generated sound from the speaker of the HMI 30. Further, the HMI control part 170 may output the information received by the HMI 30 to the communication device 20, the navigation device 50, the first control part 120, etc.

The traveling driving force output device 200 outputs the traveling driving force (torque) for the vehicle to travel to the drive wheels. The traveling driving force output device 200 includes, for example, a combination of an internal combustion engine, an electric motor, a transmission, etc., and an ECU (Electronic Control Unit) that controls them. The ECU controls the above configuration according to the information input from the second control part 160 or the information input from the driving operator 80.

The brake device 210 includes, for example, a brake caliper, a cylinder that transmits oil pressure to the brake caliper, an electric motor that generates the oil pressure in the cylinder, and a brake ECU. The brake ECU controls the electric motor according to the information input from the second control part 160 or the information input from the driving operator 80, so that the brake torque corresponding to the braking operation is output to each wheel. The brake device 210 may include, as a backup, a mechanism for transmitting the oil pressure generated by the operation of the brake pedal included in the driving operator 80 to the cylinder via a master cylinder. The brake device 210 is not limited to the configuration described above, and may be an electronically controlled hydraulic brake device that controls the actuator according to the information input from the second control part 160 and transmits the oil pressure of the master cylinder to the cylinder.

The steering device 220 includes, for example, a steering ECU and an electric motor. The electric motor, for example, applies a force to the rack and pinion mechanism to change the direction of the steering wheel. The steering ECU drives the electric motor to change the direction of the steering wheel in accordance with the information input from the second control part 160 or the information input from the steering wheel 82 of the driving operator 80.

[Regarding the Driving Mode in Lane Change]

Hereinafter, the determination of the driving mode of the vehicle M performed by the mode determination part 150 will be specifically described. In the following, examples in which the driving mode of the vehicle M at the time of lane change is determined mainly based on the respective determination results of the lane change determination part 154 and the vehicle state determination part 156 will be described in several scenes. Further, in the following, the output control of the first information and the second information in each scene will also be described. In addition, in the following description, "the vehicle M reaches the point P" means that, for example, the reference point (for example, the front end portion) of the vehicle M reaches the line extending from the point P on the road in the road width direction.

<First Scene>

Figure 4:
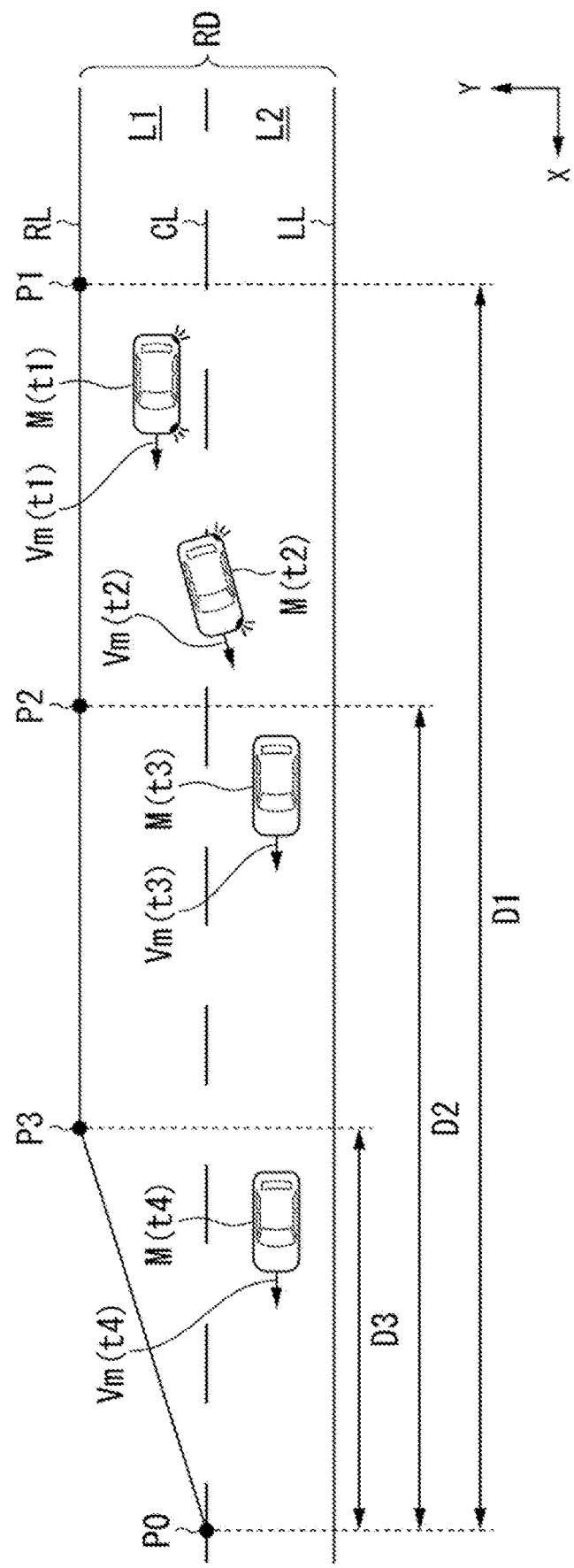
FIG. 4 is a diagram for illustrating a driving mode when changing lanes in a first scene.

FIG. 4 is a diagram for illustrating the driving mode when changing lanes in the first scene. In the following description, it is assumed that the X direction is substantially the traveling direction of the road RD and the Y direction is substantially the width direction of the road RD. The road RD is a one-sided two-lane road that is defined by the marking lines RL and LL and has the lane L1 (an example of the first lane) and the lane L2 (an example of the second lane) that can proceed in the same direction (X direction), but since the lane L1 ends at the point P0, the road becomes a one-lane road after the point P0. The lane L1 is defined by the marking lines RL and CL, and the lane L2 is defined by the marking lines CL and LL. It is assumed that the vehicle M is traveling in the lane L1 at the speed VM. Further, in the following, it is assumed that the destination direction of the vehicle M is on the side of the lane L2. In addition, since the lane L2 is a lane that continues until the end of the lane L1, it can be said that the lane L2 is a lane for the vehicle M to continue the automatic driving.

Here, normally, if the driving mode of the vehicle M is mode B when the vehicle M reaches the point P1 that comes before the point P0 by the predetermined distance D1, the lane change determination part 154 determines that it is required to change lanes, and the lane change to the lane L2, which is the destination direction, is performed by the determination on the side of the vehicle system 1. However, in the following, it is assumed that the vehicle M does not change to the lane L2 even at the time when the point P1 is reached due to a traffic jam or an obstacle, and the driving mode of the vehicle M is changed from mode B to mode D by the mode determination part 150. Further, in the following, if the predetermined condition is not satisfied at the time when the vehicle M reaches the point P2 that comes before the point P0 by the distance D2, the first information is output from the HMI 30 by the control of the HMI control part 170. Further, in the following, it is assumed that if the predetermined condition is not satisfied at the time when the vehicle M reaches the point P3 that comes before the point P0 by the distance D3, the second information is output from the HMI 30 by the control of the HMI control part 170. The section from the points P0 to P3 is an example of the section in which the current driving mode cannot be continued. Further, in the example of FIG. 4, it is assumed that the time t1 is the earliest and the times t2, t3, and t4 are delayed in this order. In addition, the position and the vehicle speed of the vehicle M at the time t* when traveling in the lane are displayed as M(t*) and VM(t*), respectively. The above-mentioned preconditions apply to the following description of each scene.

At the time t1 in FIG. 4, the vehicle M is traveling in the section between the point P1 and the point P2 in the driving mode of mode D. In this case, mode D is an example of the first driving mode. At this time, if the blinker switch 32 is operated in the direction of changing lanes, the lane change determination part 154 determines that the intention to change the lane to the lane L2 of the driver (occupant) of the vehicle M is detected. Further, at the time t1, the blinker in the direction instructed by the driver lights up (blinks) with the operation of the blinker switch 32. Thereafter, the driving control part causes the vehicle M to change lanes from the lane L1 to the lane L2. Then, the lane change determination part 154 determines that the lane change is completed, for example, at the time when the reference point of the vehicle M (for example, the center of the vehicle) crosses the marking line CL that divides the lanes L1 and L2. In the example of FIG. 4, it is determined that the lane change is completed at the time t2.

Here, in the first scene, the lane change from the lane L1 to the lane L2 performed by the driving mode of mode D is completed before the vehicle M reaches the point P2. In this case, the HMI control part 170 does not output the first information at the time when the vehicle M reaches the point P2, and does not output the second information at the time when the vehicle M reaches the point P3. Further, the mode determination part 150 continues the driving mode (mode D) when the vehicle M is traveling in the section of the points P1 to P2 of the lane L1 even after the lane change (times t2 to t4). As a result, the driving mode when the vehicle M is traveling in the lane L1 can be continued even after the lane change.

<Second Scene>

Figure 5:
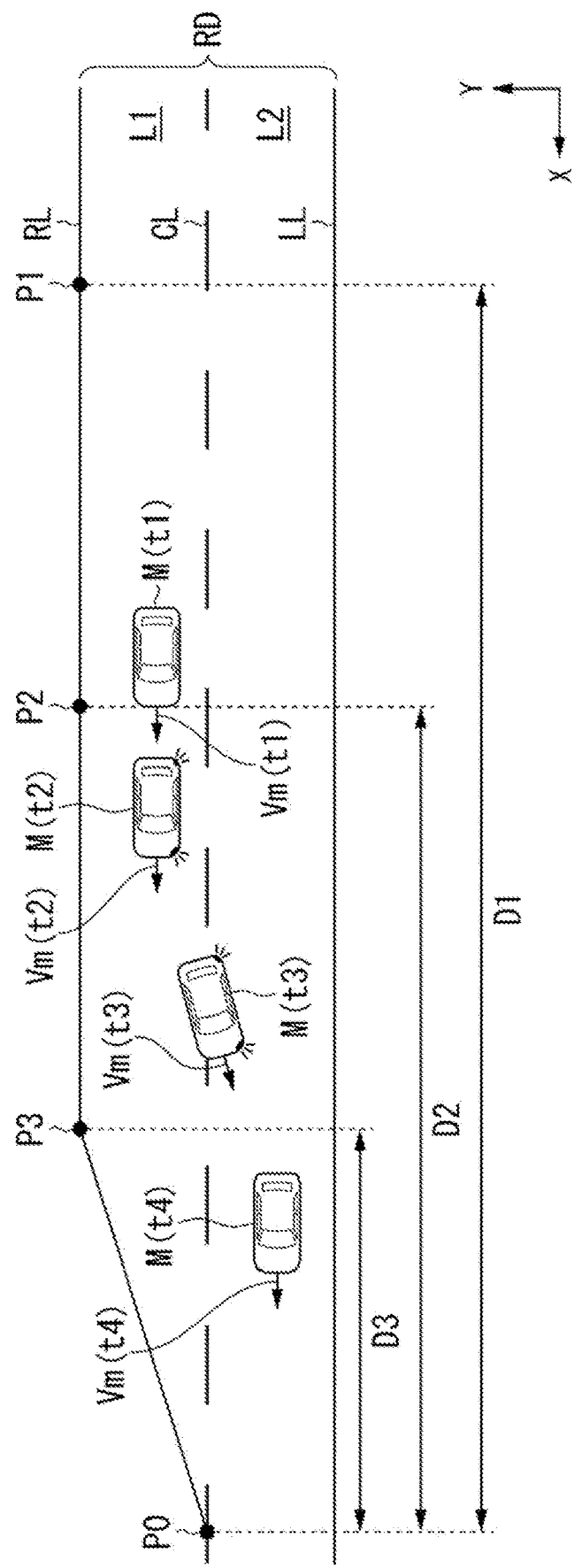
FIG. 5 is a diagram for illustrating a driving mode when changing lanes in a second scene.

Next, the driving mode when changing lanes in the second scene will be described. FIG. 5 is a diagram for illustrating the driving mode when changing lanes in the second scene. When compared with the first scene, the example of FIG. 5 differs from the first scene in that the vehicle M changes lanes from the lane L1 to the lane L2 after passing the point P2 and before reaching the point P3. The time t1 in FIG. 5 is the time when the vehicle M reaches the point P3 without changing lanes. In this case, the HMI control part 170 causes the HMI 30 to output the first information. The first information includes, for example, information for notifying the takeover of driving to the driver in advance. Further, the first information is advance notification information before the second information is notified or before the driving mode changes to a mode in which the task imposed on the occupant is large. Specifically, the first information is text information and voice information such as "driving support will be terminated soon". In addition, the first information may include, for example, information such as "because the traveling lane ends at XX [m] ahead, please change lanes by taking over the driving" and information such as "please instruct to change lanes according to the current driving mode". The first information may be continuously output, for example, until the lane change of the vehicle M is completed or until the vehicle M reaches the point P3 without changing lanes.

Further, in the second scene, it is assumed that the blinker switch 32 is operated at the timing of the time t2 after the first information is notified, and the driver's intention to change lanes to the lane L2 is detected. In this case, the blinker of the vehicle M is turned on. Thereafter, in the second scene, the lane change from the lane L1 to the lane L2 performed by the driving mode of mode D is completed at the time of the time t3 before the vehicle M reaches the point P3. In this case, the HMI control part 170 does not output the second information because the vehicle M is already traveling in the lane L2 at the time when the vehicle M reaches the point P3. Further, the mode determination part 150 continues the driving mode (mode D) when the vehicle M is traveling in the section of P1 to P3 of the lane L1 even after the lane change (times t3 to t4).

<Third Scene>

Figure 6:
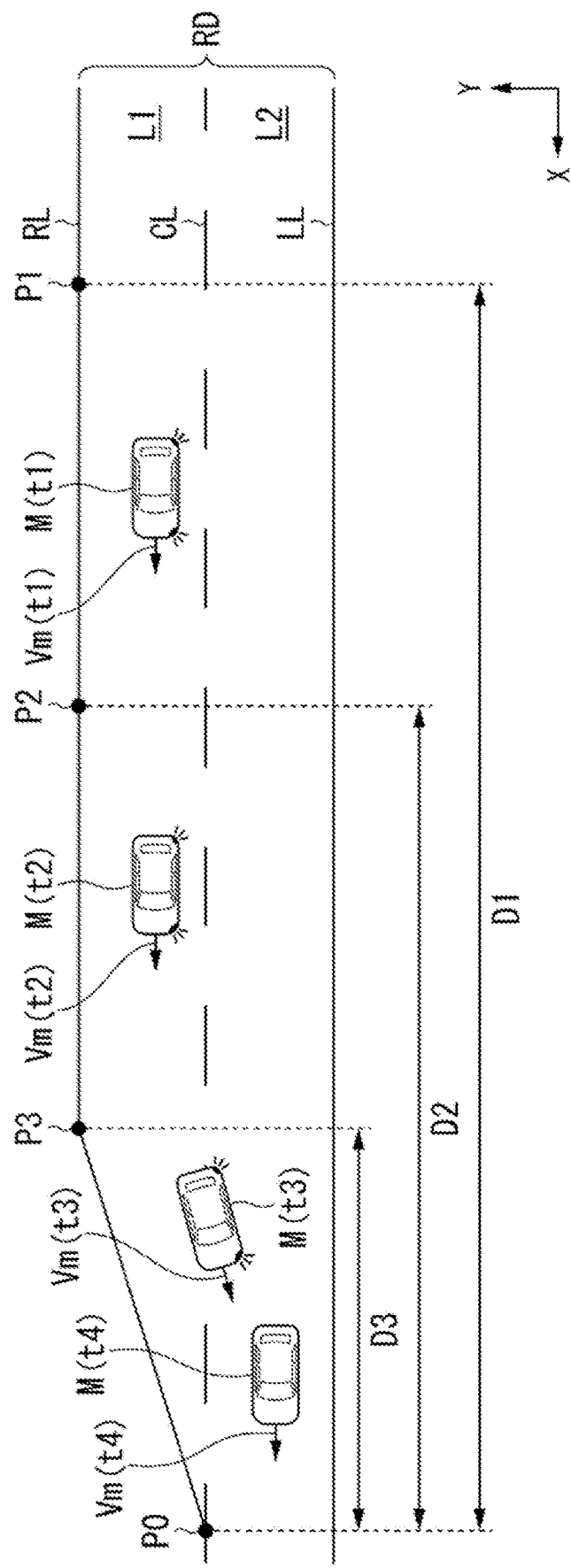
FIG. 6 is a diagram for illustrating a driving mode when changing lanes in a third scene.

Next, the driving mode when changing lanes in the third scene will be described. FIG. 6 is a diagram for illustrating the driving mode when changing lanes in the third scene. In the third scene, it is assumed that the blinker switch 32 is operated before the vehicle M reaches the points P2 and P3, and the driver's intention to change lanes to the lane L2 is detected. In this case, the blinker of the vehicle M is turned on.

When the driver's intention to change lanes to the lane L2 is detected before the vehicle M reaches the points P2 and P3 as in the third scene, the HMI control part 170 does not output the first information to the HMI 30 even if the vehicle M reaches the point P3, and does not output the second information to the HMI 30 even if the vehicle M reaches the point P2.

Further, in the third scene, since the driver's intention to change lanes to the lane L2 is detected before passing the point P3, the lane change is also executed by the driving mode of mode D in the section from the points P1 to P0. In addition, when the lane change of vehicle M is completed in the section from the points P1 to P0 (time t3), the mode determination part 150 continues the driving mode in which the vehicle travels at the points P1 to P3 in the lane L1 even after the lane change (times t3 to t4).

In the third scene, since the lane change is not completed even if the vehicle M reaches the point P3, the mode determination part 150 may change from mode D to mode E (an example of the second driving mode) and cause the occupant to change lanes by manual driving, and may change to mode D again when the lane change is completed in the section from the points P3 to P0. Mode E in this case is the second driving mode in which the task imposed on the occupant is larger than that in the first driving mode (mode D).

<Fourth Scene>

Figure 7:
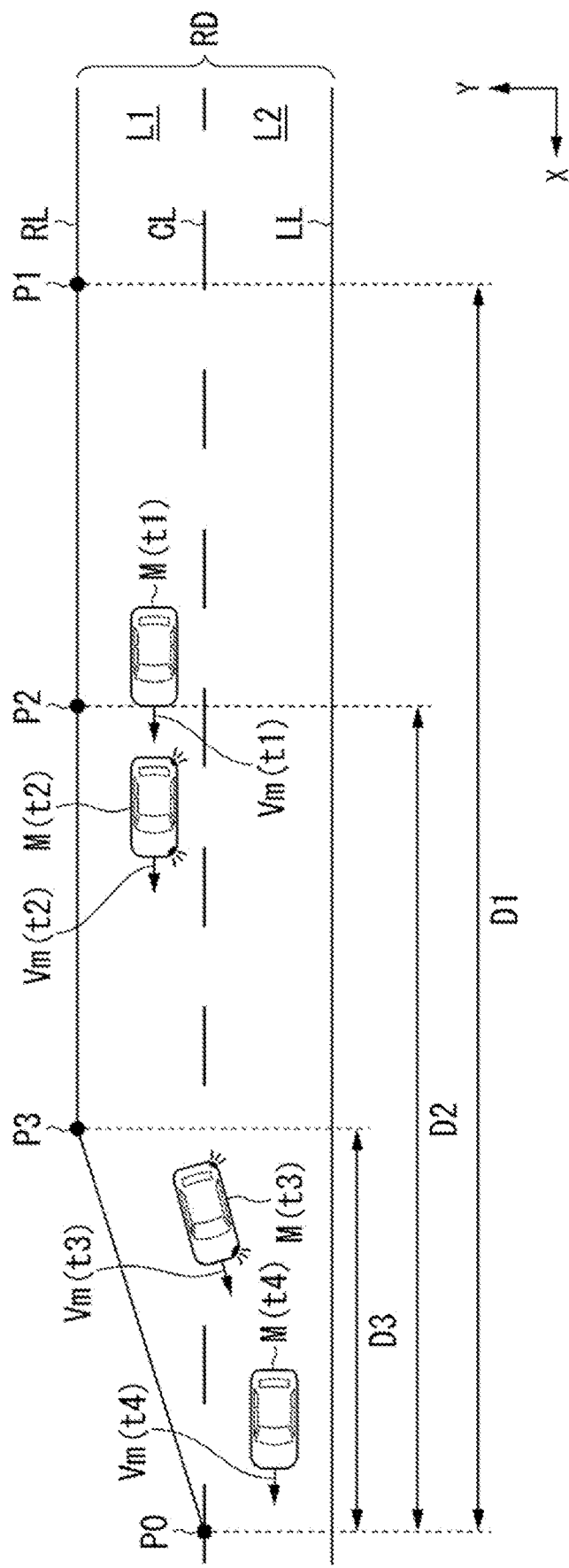
FIG. 7 is a diagram for illustrating a driving mode when changing lanes in a fourth scene.

Next, the driving mode when changing lanes in the fourth scene will be described. FIG. 7 is a diagram for illustrating the driving mode when changing lanes in the fourth scene. When compared with the second scene described above, the fourth scene differs from the second scene in that the vehicle M changes lanes from the lane L1 to the lane L2 after passing the point P3. In the fourth scene, at the time when the vehicle M reaches the point P2, the driver's intention to change lanes to the lane L2 is not detected (or the blinker is not turned on). Therefore, the HMI control part 170 causes the HMI 30 to output the first information at the time when the vehicle M reaches the point P2. Further, in the fourth scene, the blinker switch 32 is operated at the time t2 when the vehicle M is traveling in the section from the points P2 to P3, and the driver's intention to change lanes to the lane L2 is detected and the blinker of the vehicle M is turned on.

Further, in the fourth scene, the lane change is not completed even if the vehicle M reaches the point P3. Therefore, the HMI control part 170 causes the HMI 30 to output the second information at the time when the vehicle M reaches the point P3. The second information includes, for example, information for notifying that the driving mode is lowered from the current driving mode to a mode in which the task imposed on the driver (occupant) is large in the lane L1. Specifically, the second information is text information and voice information such as "driving support has been terminated". In addition, the second information may include, for example, information such as "the mode has been switched to manual driving in mode E" and information such as "the mode has been switched to a mode in which the task imposed on the driver is large. Please execute the task according to the mode." The second information may be continuously output, for example, until the lane change of the vehicle M is completed, or until the vehicle M reaches the point P0 without changing lanes.

In the case of the fourth scene described above, because the first information and the second information are notified, even if the vehicle M completes the lane change in the section from the points P3 to P0, the mode determination part 150 changes the driving mode of the vehicle M to mode E (manual driving) in which the task imposed on the occupant is larger than that in mode D at the time when the vehicle M reaches the point P3. The mode determination part 150 can suppress the execution of driving control different from the notified content by changing the driving mode according to the output of the second information in this way. Therefore, more appropriate vehicle control can be executed. In the fourth scene, for example, even if the blinker is not turned on (the driver's intention to change lanes to the lane L2 is not detected), the same mode determination can be applied when the behavior of the vehicle M regarding the lane change is the same as described above.

<Fifth Scene>

Figure 8:
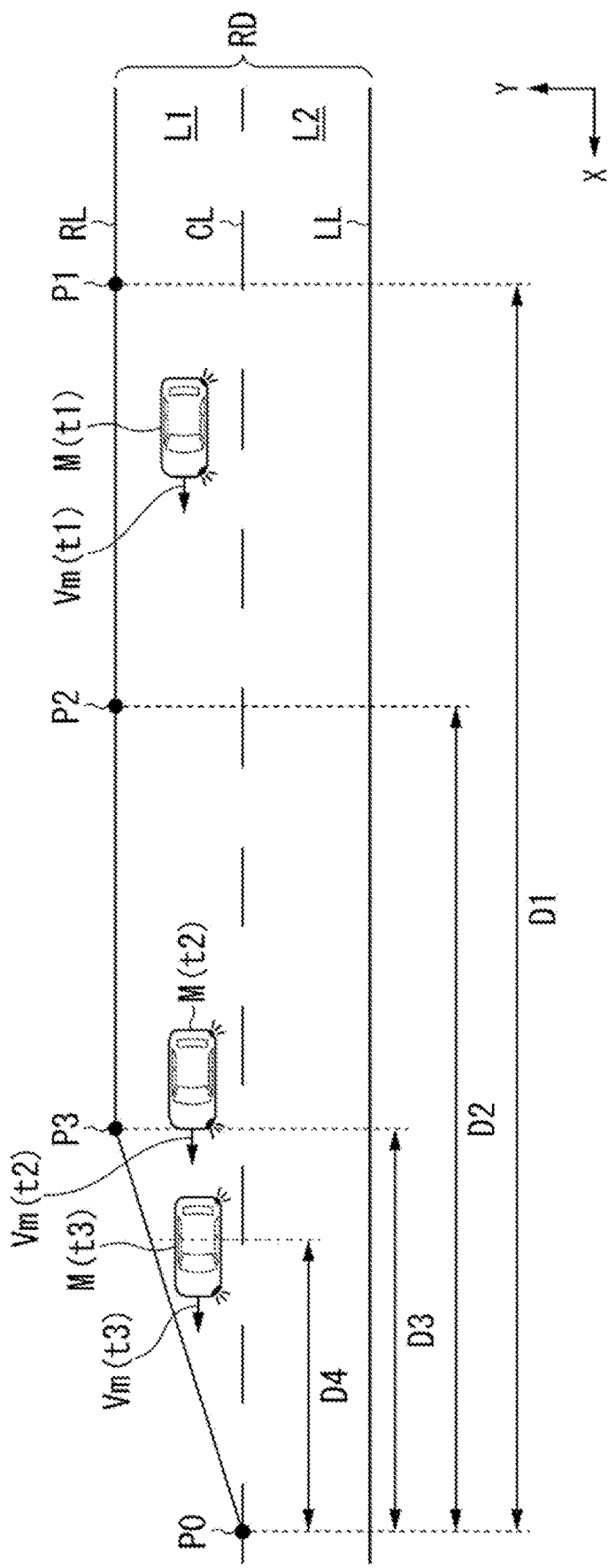
FIG. 8 is a diagram for illustrating a driving mode when changing lanes in a fifth scene.

Next, the driving mode when changing lanes in the fifth scene will be described. FIG. 8 is a diagram for illustrating the driving mode when changing lanes in the fifth scene. In the fifth scene, if the vehicle M is traveling in the lane L1 and the lane change of the vehicle M to the lane L2 is not started by the section in which the current driving mode of the vehicle M cannot be continued, the vehicle M is stopped in the lane L1. Specifically, in the fifth scene, as in the third scene described above, it is assumed that the blinker switch 32 is operated before the vehicle M reaches the points P2 and P3, and the driver's intention to change lanes to the lane L2 is detected. In this case, as in the third scene, because the blinker is turned on before the vehicle M reaches the point P2, the HMI control part 170 does not output the first information even if the vehicle M reaches the point P2, and does not output the second information even if the vehicle M reaches the point P3.

Further, in the fifth scene, the lane change is not executed even if the vehicle M passes the point P2. In this case, the HMI control part 170 may cause the HMI 30 to output information (an example of the third information) such as "please take over driving immediately". In addition, when the vehicle M reaches the distance D4 (D4<D3) that comes before the point P0 by a predetermined distance, or a lane change due to driving takeover is not executed even after a predetermined time has passed since the vehicle M reaches the point P3, the mode determination part 150 changes the current driving mode to mode F. The distance D4 is, for example, a point at which the predetermined lane change should be completed. As a result, the driving control part executes, for example, automatic driving for forcibly stopping the vehicle M at the predetermined target point on the lane L1. The time t3 indicates the time when the vehicle M stops. As a result, the vehicle M can be stopped when the vehicle M is in a situation that cannot execute the lane change. At the time t3 in the fifth scene, the HMI control part 170 may terminate the lighting of the blinker, or may turn on a hazard lamp instead of the blinker.

<Sixth Scene>

Figure 9:
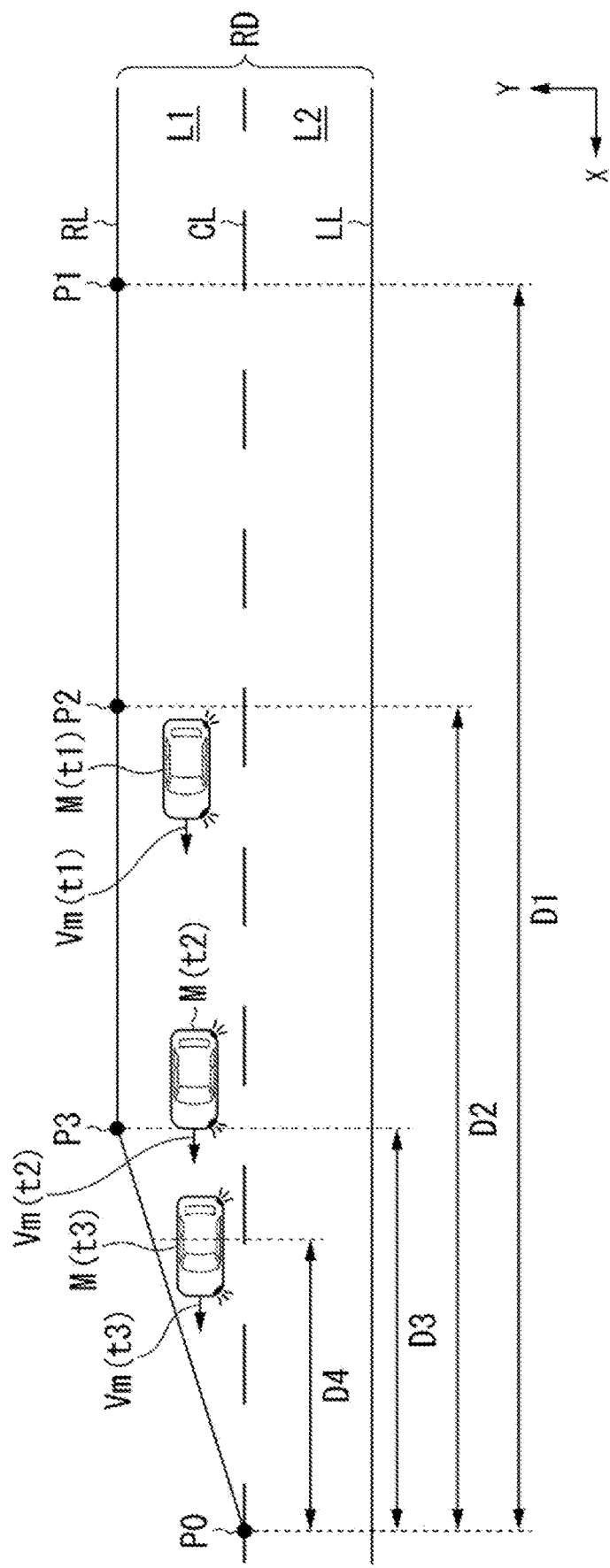
FIG. 9 is a diagram for illustrating a driving mode when changing lanes in a sixth scene.

Next, the driving mode when changing lanes in the sixth scene will be described. FIG. 9 is a diagram for illustrating the driving mode when changing lanes in the sixth scene. In the sixth scene, as in the fifth scene, if the vehicle M is traveling in the lane L1 and the lane change of the vehicle M to the lane L2 is not started by the section in which the current driving mode of the vehicle M cannot be continued, the vehicle M is stopped in the lane L1. Specifically, in the sixth scene, the blinker switch 32 is operated while the vehicle M is traveling in the section from the points P2 to P3, and the driver's intention to change lanes to the lane L2 is detected and the blinker is turned on (time t1). In this scene, the HMI control part 170 causes the HMI 30 to output the first information at the time when the vehicle M reaches the point P2. Further, at the time when the vehicle M reaches the point P3, the HMI 30 outputs the second information.

Here, as in the fifth scene, when the lane change is not executed even if the vehicle M passes the point P2, the HMI control part 170 may cause the HMI 30 to output information (an example of the third information) such as "please take over driving immediately". In addition, when the vehicle M reaches the distance D4 (D4<D3) that comes before the point P0 by a predetermined distance, or a lane change due to driving takeover is not executed even after a predetermined time has passed since the vehicle M reaches the point P3, the mode determination part 150 changes the current driving mode to mode F. As a result, the driving control part executes, for example, automatic driving for forcibly stopping the vehicle M at the predetermined target point on the lane L1. The time t3 indicates the time when the vehicle M stops. As a result, the vehicle M can be stopped when the vehicle M is in a situation that cannot execute the lane change. At the time t3 in the sixth scene, the HMI control part 170 may terminate the lighting of the blinker, or may turn on the hazard lamp instead of the blinker.

As described above, the mode determination part 150 can execute more appropriate driving control based on the timing at which the driver's intention to change lanes is detected (or the timing at which the blinker is turned on), the status of the lane change of the vehicle M (for example, the position of completion), and the output status of predetermined information (for example, first information, second information, etc.) of the HMI control part 170. For example, as shown in the first to third scenes described above, when the lane change is completed under the predetermined condition, the driving mode before the lane change is continued even after the lane change. In the first to third scenes, the mode determination part 150 may perform control to suppress the driving mode of the vehicle M from being lowered to a driving mode in which the task imposed on the driver is large when the lane change of the vehicle M is completed without the output of the second information from the HMI control part 170. Furthermore, the above-mentioned control may be executed regardless of whether the intention to change lanes of the driver of the vehicle M is detected.

Besides, as shown in the first, third, and fifth scenes described above, the HMI control part 170 suppresses the output of the first information and the second information when the driver's intention to change lanes to the lane L2 where the vehicle M can continue to travel is detected or the blinker is turned on before the timing of notification of the first information. As a result, it is possible to prevent the occupant from being confused by the notification of the first information and the second information. Furthermore, according to the control in the second and fourth scenes, even if the lane is changed after the output of the first information, the driving mode before the lane change may be continued or may be changed to a driving mode in which the task imposed on the driver is large (for example, manual driving) depending on the position of completion of the lane change, so that more appropriate driving control can be executed. Therefore, according to the present embodiment, more appropriate vehicle control (driving control, output control) can be executed according to the situation of the vehicle M in the lane change.

In the first to sixth scenes described above, the points at which the predetermined information (first information and second information) is output are set according to the distance from the point P0, but the output timing may be different according to the speed VM of the vehicle M, the road shape (gradient, road width, curvature), etc.

[Processing Flow]

Figure 10:
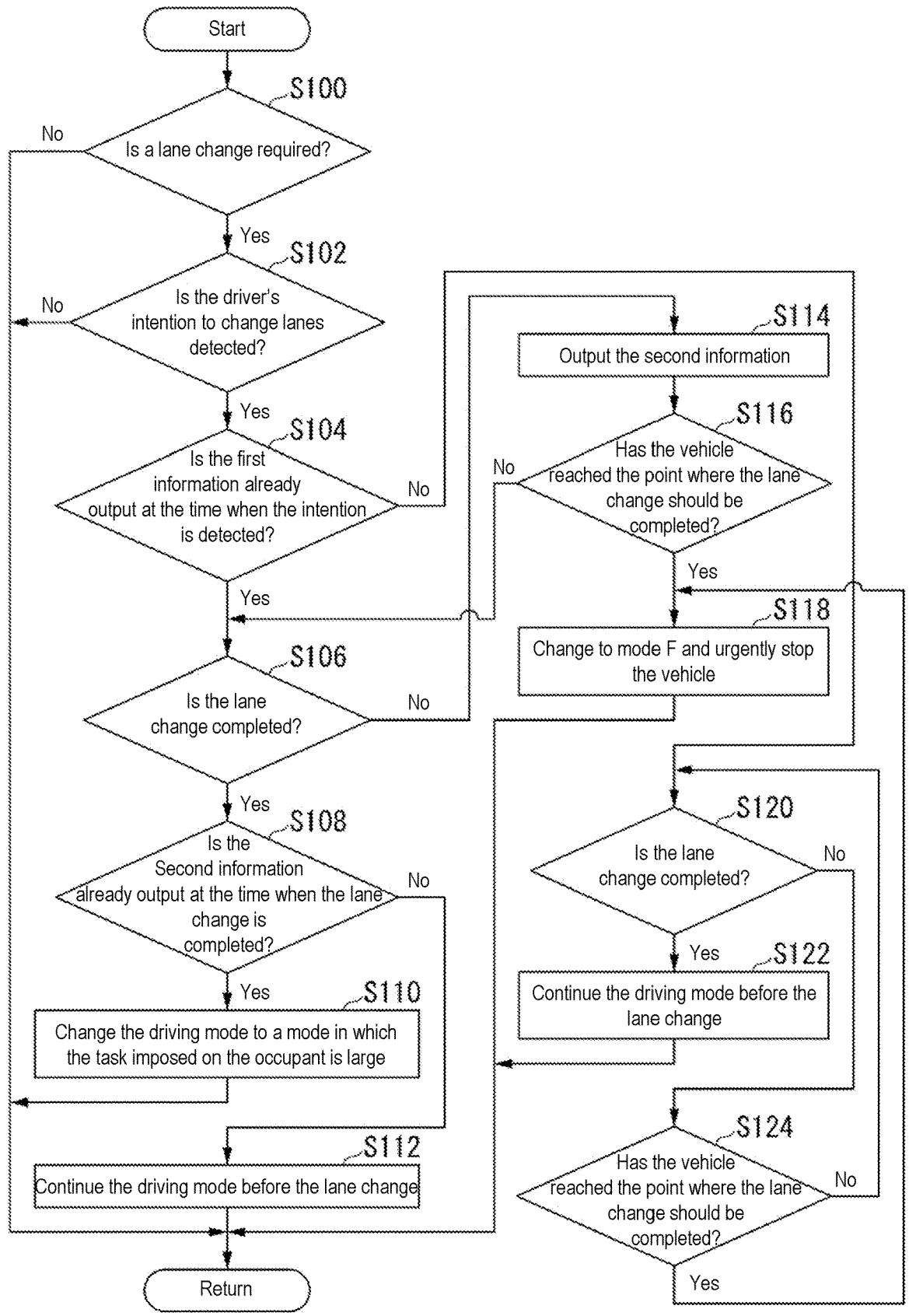
FIG. 10 is a flowchart showing an example of a processing flow executed by an automatic driving control device 100 of an embodiment.

FIG. 10 is a flowchart showing an example of a processing flow executed by the automatic driving control device 100 of an embodiment. In the example of FIG. 10, among the processing executed by the automatic driving control device 100, the processing of determining the driving mode in the lane change will be mainly described. The processing shown hereinafter may be executed as the lane changing event. Further, the processing shown in FIG. 10 may be repeatedly executed at a predetermined timing or in a predetermined cycle, for example, during the execution of automatic driving or driving support. Hereinafter, it is assumed that the driving mode of the vehicle M is mode C or mode D.

In the example of FIG. 10, the lane change determination part 154 determines whether it is required for the vehicle M to change lanes (step S100). If it is determined that a lane change is required, the lane change determination part 154 determines whether the driver's intention to change lanes to the lane change destination is detected (step S102). If it is determined that the driver's intention to change lanes is detected, the vehicle state determination part 156 determines whether the first information is already output by the HMI control part 170 at the time when the intention to change lanes is detected (step S104). If it is determined that the first information is already output, the vehicle state determination part 156 determines whether the lane change of the vehicle M is completed (step S106).

If it is determined that the lane change of the vehicle M is completed, the vehicle state determination part 156 determines whether the second information is already output at the time when the lane change is completed (step S108). If it is determined that the second information is already output at the time when the lane change is completed, the mode determination part 150 changes the driving mode of the vehicle M from the current mode to a mode in which the task imposed on the occupant (driver) is large (step S110). Further, in the processing of step S108, if it is determined that the second information is not output at the time when the lane change is completed, the mode determination part 150 continues the driving mode of the vehicle M before the lane change after the lane change (step S112).

In addition, if it is determined in the processing of step S106 that the lane change is not completed, the HMI control part 170 causes the HMI 30 to output the second information at the time when the vehicle M reaches the point P3 that comes before the point P0 by the distance D3 (step S114). Next, the vehicle state determination part 156 determines whether the vehicle M has reached the point where the lane change should be completed (step S116). If it is determined that the point where the lane change should be completed has not been reached, the processing returns to step S106. If it is determined that the point where the lane change should be completed has been reached, the mode determination part 150 changes the mode to mode F and urgently stops the vehicle M at the target point (step S118).

Further, in the processing of step S104, if the first information is not already output at the time when the driver's intention to change lanes is detected, the vehicle state determination part 156 determines whether the lane change of the vehicle M is completed (step S120). If it is determined that the lane change is completed, the mode determination part 150 continues the driving mode of the vehicle M before the lane change after the lane change (step S122). In addition, if it is determined in the processing of step S120 that the lane change is not completed, the vehicle state determination part 156 determines whether the vehicle M has reached the point where the lane change should be completed (step S124). If it is determined that the point where the lane change should be completed has not been reached, the processing returns to step S120. Further, if it is determined that the point where the lane change should be completed has been reached, the processing of step S118 is performed. As a result, the processing of this flowchart ends.

Further, if it is determined in the processing of step S100 that the lane change is not required or if it is determined in the processing of step S102 that the driver's intention to change lanes is not detected, the processing of this flowchart ends. If it is determined in the processing of step S102 that the driver's intention to change lanes is not detected, the mode determination part 150 may change to mode F and control the vehicle M to urgently stop at the time when the vehicle M reaches the point where the lane change should be completed.

The above-described embodiment includes the recognition part 130 that recognizes the surrounding situation of the vehicle M; the driving control part (action plan generation part 140, second control part 160) that controls one or both of the steering and acceleration/deceleration of the vehicle M and causes the vehicle M to travel in any one of a plurality of driving modes; and the HMI control part (output control part) 170 that, when determining that there is a section where the current driving mode cannot be continued in the first lane in which the vehicle M travels based on the surrounding situation recognized by the recognition part 130, and the vehicle M is caused to change lanes from the first lane to the second lane, outputs predetermined information by the HMI (output part) 30 before the vehicle M reaches the section. The predetermined information includes first information to be output before reaching the section, and second information to be output after reaching the section. When detecting the intention of the occupant of the vehicle M to change lanes after the first information is output by the HMI control part 170, and the lane change to the second lane is completed before output of the second information, the driving control part continues the first driving mode that is being executed during traveling in the first lane even after the lane change is completed, and when detecting the intention of the occupant of the vehicle M to change lanes after the first information is output by the HMI control part 170, and the lane change to the second lane is completed after output of the second information, the driving control part changes the driving mode of the vehicle M to the second driving mode in which the task imposed on the occupant is larger than in the first driving mode, so that more appropriate vehicle control can be executed according to the situation of the vehicle in the lane change.

Specifically, according to the above-described embodiment, in a scene where the limit of continuation of the driving mode such as a decrease in lanes can be predicted, the driving mode before the lane change can be maintained when the lane change satisfying the predetermined condition is executed, so as to execute more appropriate driving control. The mode control at the time of changing lanes in the present embodiment may not be applied at the time of changing lanes in, for example, a branch lane or a junction.

The embodiment described above can be expressed as follows. A vehicle control device includes: a storage device that stores a program; and a hardware processor. The hardware processor executes the program stored in the storage device, so as to recognize a surrounding situation of a vehicle; control one or both of steering and acceleration/deceleration of the vehicle and cause the vehicle to travel in any one of a plurality of driving modes; when determining that there is a section where a current driving mode cannot be continued in a first lane in which the vehicle travels based on the surrounding situation recognized, and the vehicle is caused to change lanes from the first lane to a second lane, output predetermined information by an output part before the vehicle reaches the section, wherein the predetermined information includes first information to be output before reaching the section, and second information to be output after reaching the section; when detecting an intention of an occupant of the vehicle to change lanes after the first information is output by the output part, and a lane change to the second lane is completed before output of the second information, continue a first driving mode that is being executed during traveling in the first lane even after the lane change is completed; and when detecting the intention of the occupant of the vehicle to change lanes after the first information is output by the output part, and the lane change to the second lane is completed after output of the second information, change a driving mode of the vehicle to a driving mode in which a task imposed on the occupant is larger than in the first driving mode.

Although the aspects for carrying out the disclosure have been described above with reference to the embodiments, the disclosure is not limited to these embodiments, and various modifications and substitutions can be added without departing from the gist of the disclosure.

What is claimed is:

1. A vehicle control device, comprising:
a storage medium which is non-transitory; and
a processor coupled to the storage medium and configured at least to:
recognize a surrounding situation of a vehicle;
controls control one or both of steering and acceleration/deceleration of the vehicle and causes the vehicle to travel in any one of a plurality of driving modes; and
output, when determining that there is a section where a current driving mode cannot be continued in a first lane in which the vehicle travels based on the surrounding situation recognized by the processor, and the vehicle is caused to change lanes from the first lane to a second lane, outputs predetermined information by a human machine interface (HMI) before the vehicle reaches the section,
wherein the predetermined information comprises first information to be output before reaching the section, and second information to be output after reaching the section,
when detecting an intention of an occupant of the vehicle to change lanes after the first information is output by the processor, and a lane change to the second lane is completed before output of the second information, the processor is further configured to continue a first driving mode that is being executed during traveling in the first lane even after the lane change is completed, and
when detecting the intention of the occupant of the vehicle to change lanes after the first information is output by the processor, and the lane change to the second lane is completed after output of the second information, the processor is further configured to change a driving mode of the vehicle to a second driving mode in which a task imposed on the occupant is larger than in the first driving mode.

2. The vehicle control device according to claim 1, wherein when detecting the intention of the occupant of the vehicle to change lanes before the first information is output, the processor is configured to not output the first information and the second information to the occupant and continues the first driving mode that is being executed during traveling in the first lane even if a position of completion of the lane change is in the section.

3. The vehicle control device according to claim 1, wherein when the lane change of the vehicle to the second lane is not started by the section where the current driving mode of the vehicle cannot be continued while the vehicle is traveling in the first lane, the processor is configured to stop the vehicle in the first lane.

4. The vehicle control device according to claim 2, wherein when the lane change of the vehicle to the second lane is not started by the section where the current driving mode of the vehicle cannot be continued while the vehicle is traveling in the first lane, the processor is configured to stop the vehicle in the first lane.

5. The vehicle control device according to claim 1, wherein when the lane change of the vehicle is completed before the second information is output by the processor, the processor is further configured to suppress the driving mode of the vehicle from changing to the second driving mode regardless of whether the intention of the occupant of the vehicle to change lanes is detected.

6. The vehicle control device according to claim 2, wherein when the lane change of the vehicle is completed before the second information is output by the processor, the processor is further configured to suppress the driving mode of the vehicle from changing to the second driving mode regardless of whether the intention of the occupant of the vehicle to change lanes is detected.

7. The vehicle control device according to claim 3, wherein when the lane change of the vehicle is completed before the second information is output by the processor, the processor is further configured to suppress the driving mode of the vehicle from changing to the second driving mode regardless of whether the intention of the occupant of the vehicle to change lanes is detected.

8. The vehicle control device according to claim 1, wherein the first information comprises information for notifying a takeover of driving to the occupant of the vehicle in advance on the first lane.

9. The vehicle control device according to claim 2, wherein the first information comprises information for notifying a takeover of driving to the occupant of the vehicle in advance on the first lane.

10. The vehicle control device according to claim 3, wherein the first information comprises information for notifying a takeover of driving to the occupant of the vehicle in advance on the first lane.

11. The vehicle control device according to claim 5, wherein the first information comprises information for notifying a takeover of driving to the occupant of the vehicle in advance on the first lane.

12. The vehicle control device according to claim 1, wherein the second information comprises information for notifying a change from the current driving mode to the second driving mode on the first lane.

13. The vehicle control device according to claim 2, wherein the second information comprises information for notifying a change from the current driving mode to the second driving mode on the first lane.

14. The vehicle control device according to claim 3, wherein the second information comprises information for notifying a change from the current driving mode to the second driving mode on the first lane.

15. The vehicle control device according to claim 5, wherein the second information comprises information for notifying a change from the current driving mode to the second driving mode on the first lane.

16. The vehicle control device according to claim 1, wherein the second lane is a lane for the vehicle to reach a destination or a lane for continuing automatic driving.

17. The vehicle control device according to claim 1, wherein the lane change comprises a lane change executed by the processor by detecting the intention of the occupant of the vehicle, and a lane change due to manual driving of the occupant.

18. The vehicle control device according to claim 1, wherein the processor is configured to determine that the lane change from the first lane to the second lane is completed when the vehicle crosses a marking line that divides the first lane and the second lane.

19. A vehicle control method for a computer to:
recognize a surrounding situation of a vehicle;
control one or both of steering and acceleration/deceleration of the vehicle and cause the vehicle to travel in any one of a plurality of driving modes;
when determining that there is a section where a current driving mode cannot be continued in a first lane in which the vehicle travels based on the surrounding situation recognized, and the vehicle is caused to change lanes from the first lane to a second lane, output predetermined information by an output part before the vehicle reaches the section,
wherein the predetermined information comprises first information to be output before reaching the section, and second information to be output after reaching the section,
when detecting an intention of an occupant of the vehicle to change lanes after the first information is output by the output part, and a lane change to the second lane is completed before output of the second information, continue a first driving mode that is being executed during traveling in the first lane even after the lane change is completed; and
when detecting the intention of the occupant of the vehicle to change lanes after the first information is output by the output part, and the lane change to the second lane is completed after output of the second information, change a driving mode of the vehicle to a second driving mode in which a task imposed on the occupant is larger than in the first driving mode.

20. A non-transient computer-readable recording medium recording a program for a computer comprising a processor and a non-transitory storage medium, the program is to be loaded into the processor and execute functions comprising:
recognize, by the processor, a surrounding situation of a vehicle;
control, by the processor, one or both of steering and acceleration/deceleration of the vehicle and cause the vehicle to travel in any one of a plurality of driving modes;
when determining that there is a section where a current driving mode cannot be continued in a first lane in which the vehicle travels based on the surrounding situation recognized, and the vehicle is caused by the processor to change lanes from the first lane to a second lane, output predetermined information by a human machine interface (HMI) before the vehicle reaches the section,
wherein the predetermined information comprises first information to be output before reaching the section, and second information to be output after reaching the section,
when detecting, by the processor, an intention of an occupant of the vehicle to change lanes after the first information is output by the HMI, and a lane change to the second lane is completed before output of the second information, the processor continues a first driving mode that is being executed during traveling in the first lane even after the lane change is completed; and
when detecting, by the processor, the intention of the occupant of the vehicle to change lanes after the first information is output by the HMI, and the lane change to the second lane is completed after output of the second information, the processor changes a driving mode of the vehicle to a second driving mode in which a task imposed on the occupant is larger than in the first driving mode.

* * * * *